May 12, 1925. Re. 16,070

O. KIRBY

AUTOMATIC TELEPHONE EXCHANGE SYSTEM

Original Filed June 13, 1909 3 Sheets-Sheet 1

Inventor
Omer Kirby
Chas. W. Candy Atty.

May 12, 1925. Re. 16,070

O. KIRBY

AUTOMATIC TELEPHONE EXCHANGE SYSTEM

Original Filed June 19, 1909 3 Sheets-Sheet 2

Inventor
Omer Kirby
Chas. M. Candy Atty.

May 12, 1925. Re. 16,070
O. KIRBY
AUTOMATIC TELEPHONE EXCHANGE SYSTEM
Original Filed June 19, 1909 3 Sheets-Sheet 3
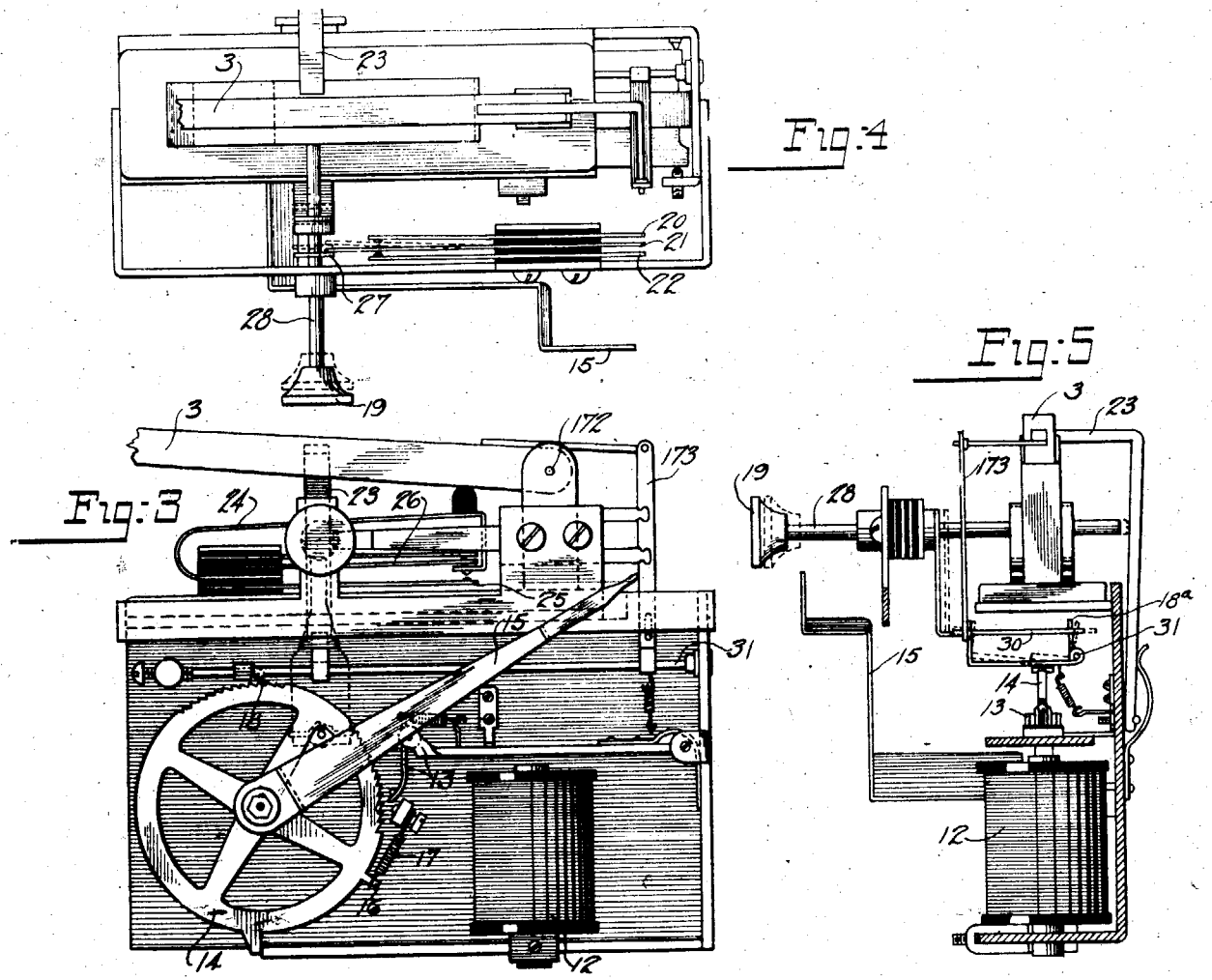
Inventor
Omer Kirby
Chas. W. Candy Atty.

Reissued May 12, 1925. Re. 16,070

UNITED STATES PATENT OFFICE.

OMER KIRBY, OF CHICAGO, ILLINOIS, ASSIGNOR TO AUTOMATIC ELECTRIC COMPANY, OF CHICAGO, ILLINOIS, A CORPORATION OF ILLINOIS.

AUTOMATIC TELEPHONE-EXCHANGE SYSTEM.

Original No. 1,172,366, dated February 22, 1916, Serial No. 503,109, filed June 19, 1909. Application for reissue filed July 30, 1920. Serial No. 400,257.

*To all whom it may concern:*

Be it known that I, OMER KIRBY, a citizen of the United States of America, and resident of Chicago, Cook County, Illinois, have invented a certain new and useful Improvement in Automatic Telephone-Exchange Systems, of which the following is a specification.

My invention relates to automatic or semi-automatic telephone exchange systems.

The object of my invention is the provision of a system in which no electrical impulses corresponding to the number of the called subscriber are transmitted by the calling subscriber.

My invention contemplates, therefore, a system in which the electrical impulses for producing the numerical switching operations are transmitted over the line circuit by mechanism at the exchange or central station, and in which devices responsive to these impulses are provided at the substations, whereby the automatic operation of the switches at the exchange or central station may be interrupted or stopped at the proper time by the calling subscriber, each switch operating automatically until stopped at some point in the operation thereof corresponding to the digit of the called number, and each numerical switch operating automatically as soon as connection is made therewith, so that the only act required on the part of the calling subscriber is the topping of the switch at the proper point in its operation, but each of the different acts on the part of the calling subscriber, one for each digit of the called number, alternating with the different numerical switching operations which occur at the exchange or central station.

It also contemplates the provision of a system in which the electrical impulses corresponding to the different digits of the called number are transmitted over the line circuit by devices at the exchange or central station, each substation being provided with a device responsive to such impulses, and with mechanism for stopping the device at the calling substation as soon as the switch operating in synchronism therewith has reached the predetermined point in its operation which will give the calling subscriber a connection in accordance with the called number.

It further contemplates a system in which numerical switches, such as selectors or connectors, are so constructed that the mere selection of and connection with an idle switch of either kind will serve automatically to start the operation thereof, which operation will continue until interrupted by the mechanism at the calling substation, which mechanism may be of any suitable character so far as this aspect of my invention is concerned.

It further contemplates a system in which the switches have vertical motion to select groups and rotary motion to connect with a line in any selected group, the substations being provided with step-by-step switches that operate in synchronism with the vertical step-by-step operations of all of the numerical switches, and which also operate in synchronism with the rotary step-by-step motions of the connectors or other switches for making the final connection with the called subscriber's line.

It further contemplates a system in which the substations are provided with indicators, and with means at the exchange or central station for transmitting impulses for operating said indicators in synchronism with the numerical switches, such as selectors and connectors, whereby any calling subscriber may observe the progress of the call, each indicator operating once for each digit of the called number.

It further contemplates a system in which automatic trunking switches are employed, and in which the subscribers' lines are free from operating grounds at the substations thereof, means being provided for preventing seizure of a trunk by the mere taking down of the receiver at the calling substation, or by the operation of the switch hook, whereby a calling subscriber cannot undesirably monopolize a trunk by taking down his receiver and then waiting some time before doing the other things which are necessary for making the call.

It further contemplates a system in which the called subscriber may control the connection, and may, without releasing such connection, operate an alarm signal at the exchange or central station, whereby the called subscriber may always ascertain from which substation the call came, if for any reason this becomes necessary or desirable.

My invention also contemplates certain novel features and details of construction and combinations tending to increase the general efficiency of a telephone exchange system of this particular character.

To the foregoing and other useful ends my invention consists in matters hereinafter set forth and claimed.

In the accompanying drawings Figure 1 shows diagrammatically the calling subscriber's substation A and a central office switching apparatus involving the principles of my invention. To the line of substation A there is allotted the line switch C, which latter is controlled by the master switch D, and at E there is represented a first selector switch.

In Figure 2 there is shown diagrammatically a connector switch F of improved construction. At H there is shown a central ringer generator, while at I a common busy signaling apparatus is represented. To the line of substation A′ there is allotted the line switch C′, which is like the line switch C.

Figs. 1 and 2 taken together represent the central office switching apparatus involved in establishing a connection between the subscribers' stations A and A′. In Fig. 2 is shown a central battery B having its positive terminal preferably grounded at G. The central office switching apparatus is of the general type shown in English Patent No. 26,301 of 1906, but with new arrangement and changes of circuits to adapt it to operate in connection with a two-wire system—that is, a system in which there is no ground connection at the subscriber's station. The line switches C and C′ and master switch D are modified forms of the switches disclosed in The Western Electrician of January 25, 1906, and the American Telephone Journal of June 6, 1908. The first selector E is of the same general mechanical construction as the selector switch shown in United States Letters Patent No. 815,321, granted March 13, 1906, to Keith, Erickson & Erickson, while the connector switch F (Fig. 2) is of the general form shown in United States Letters Patent No. 815,176, granted March 13, 1906, to Keith, Erickson & Erickson.

Figs. 3 and 4 are a front and top view, respectively, of the substation impulse-indicating device.

Fig. 5 is a sectional end view of the impulse-indicating device, along the line 5—5 of Fig. 3.

Figure 1:
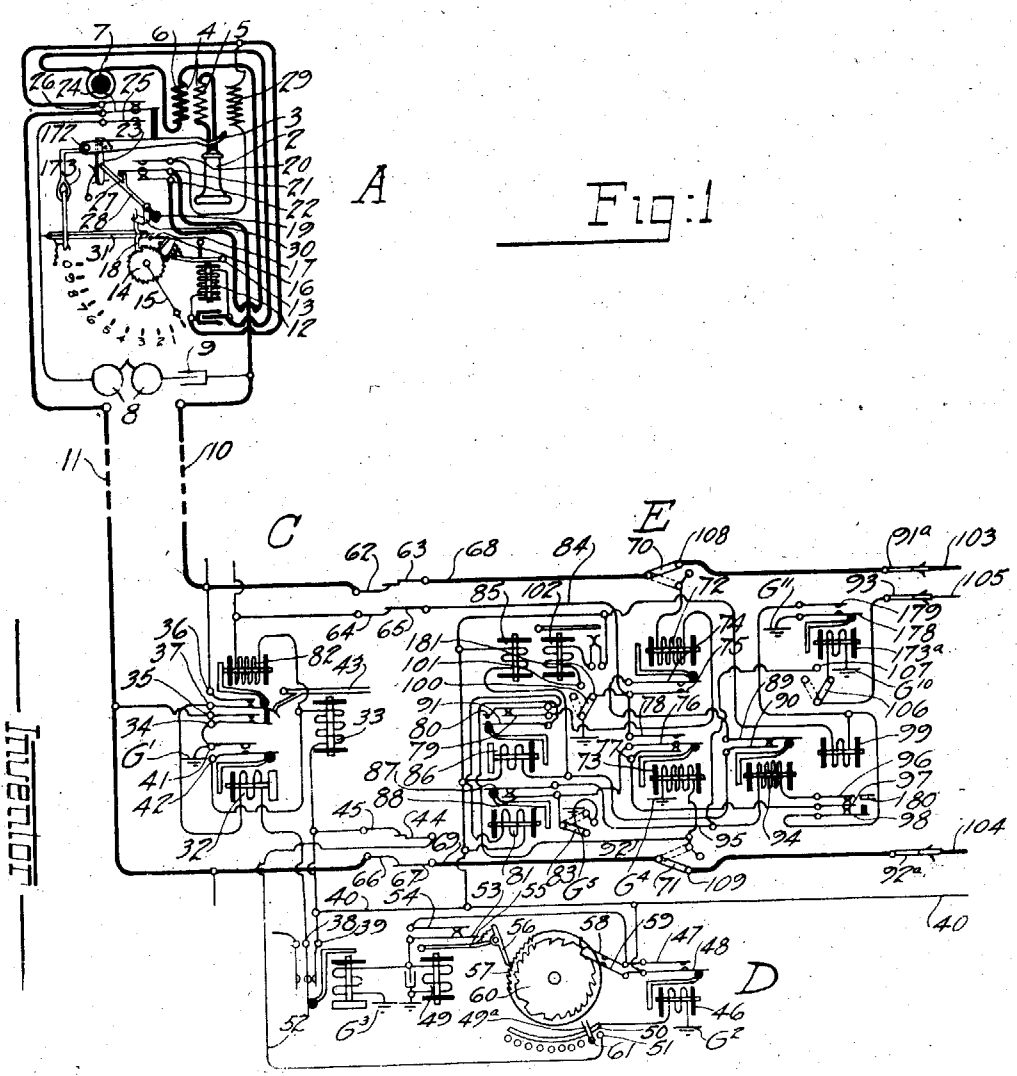

The substation A is somewhat different from the usual automatic substation. It comprises the usual receiver 2, switch hook 3, induction coil 4 which is composed of the secondary winding 5 and the primary winding 6 in series with the transmitter 7. When the switch hook is in normal position the ringer 8, in series with the condenser 9, is bridged across the line conductors 10 and 11. Since the central office switches are not operated by impulses originating at the subscriber's station, there is no occasion for the usual impulse springs and wheel. There is, however, provided a device for indicating the impulses to the calling subscriber in order that the central office switches may be controlled and caused to operate according to the desired number. This indicating mechanism, shown in Figs. 3, 4 and 5, comprises a magnet 12 for operating the armature and pawl 13, which in turn, when the magnet energizes, rotates the ratchet wheel 14 one step, so that the pointer 15 moves over the seals. To the ratchet wheel 14 there is secured the arm 16, to which latter there is fastened one end of a coil spring 17, the other end of which is secured to a pin. This spring 17 provides the means for restoring the ratchet wheel and pointer when the dog 18 is out of engagement with the teeth of the wheel 14. The push button 19 controls the switch hook, the springs 20, 21 and 22 and also the dog 18, which latter maintains the ratchet wheel 14 in its advanced position. The switch hook is locked in its normal position by the catch 23, as shown at 162 at substation A′ (Fig. 2); but when the receiver is removed and the button 19 pressed, the catch is carried out of its locking position and permits the switch hook to rise, whereby the spring 24 is carried from the spring 25 into contact with the spring 26. Also, the arm 27 upon the rod 28 carries the spring 21 from the spring 22 into contact with the spring 20, thereby bridging the resistance coil 29 (Fig. 1) across the line conductors 10 and 11. Furthermore, when the button 19 is pressed, the member 30 engages the end of the lever 18ª, moves the shaft 31, and carries the dog 18 out of contact with the ratchet teeth. In response to the tension of the spring 17 the wheel 14 returns to normal, thereby restoring the pointer 15 to starting place on the scale.

Figure 2:
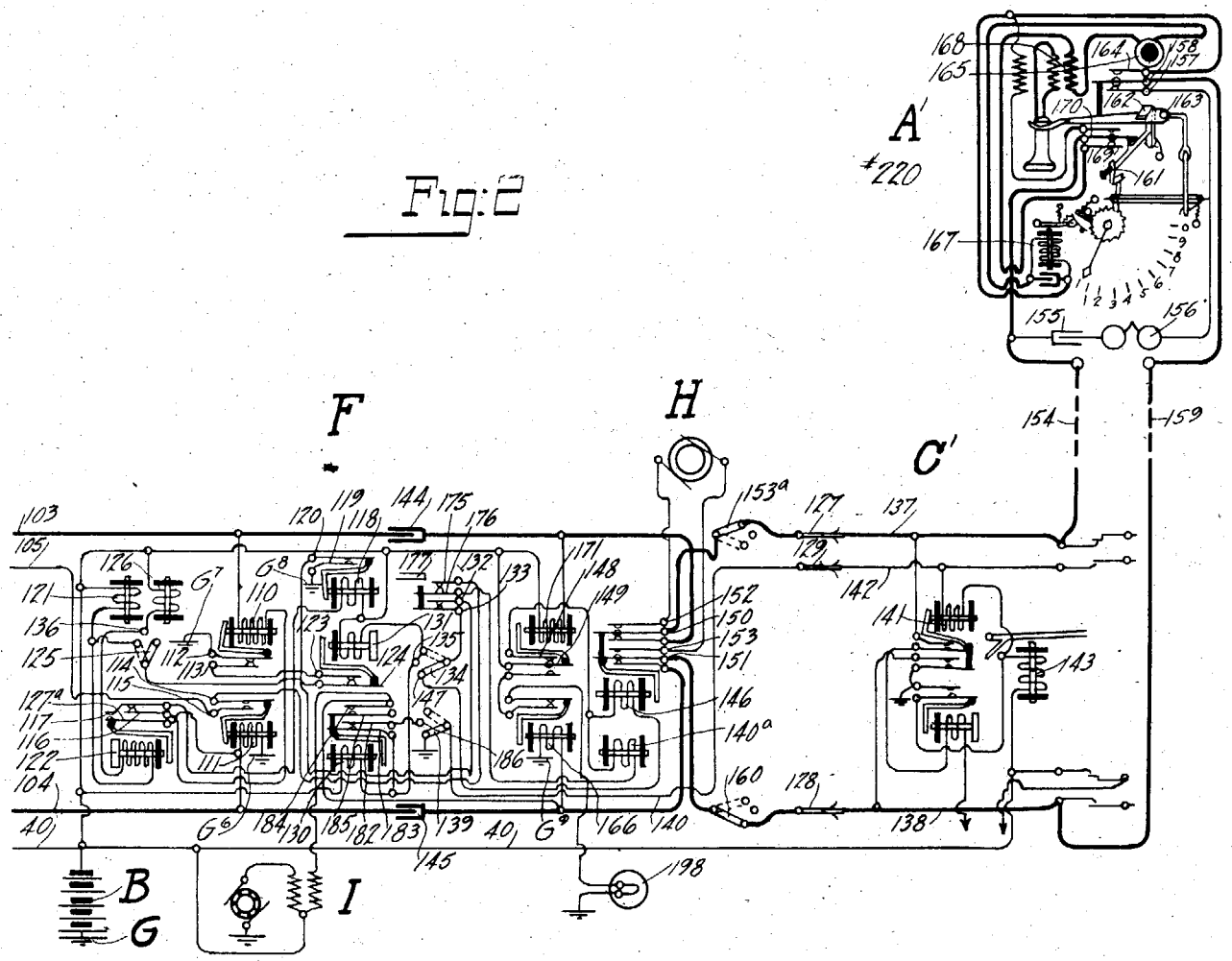

A clearer understanding of my improved system may be had from an explanation of its operation when a subscriber operates the central office switches to establish a connection. For example, it will be pointed out how the subscriber at substation A may operate the main office switches to establish connection with the substation A′ (Fig. 2), the number of which is 220. As previously stated, in my present system there is no impulse-sending device at the subscriber's station, the impulses being made at the central office, and the subscriber controlling the number thereof by means of a push button. When the receiver is removed from the switch hook no operation occurs; but when the button 19 is pressed and released and the switch hook rises the primary circuit is bridged across the line conductors 10 and 11, thereby closing an energizing circuit through the line relay 32 of the line switch C. When this relay energizes a circuit is closed through the trip or plunger magnet 33, which then operates to thrust the plunger into a bank terminal and extend the calling line conductors to the trunk conductors leading to the first selector switch E. When the line is extended to the selector E this switch operates automatically and independently of the subscriber to step the shaft and shaft wipers in a vertical direction. By means of the button 19, however, the subscriber controls the number of vertical impulses, and when the pointer 15 indicates 2 on the scale the button 19 is pressed to bridge the resistance coil 29 across the line conductors, whereby the vertical steps cease and a rotary impulse occurs at the selector to rotate the shaft wipers into contact with an idle trunk line leading to a connector switch H (Fig. 2). The connector switch then operates to carry its shaft wipers into contact with the bank contacts corresponding to the line #220.

When the receiver is removed from the switch hook and the button 19 is pressed and released, and when the springs 24 and 26 and 21 and 22 engage, the energizing circuit for the line relay 32 extends from ground G′ to the springs 34 and 35, line conductor 11, springs 24 and 26, magnet 12, transmitter 7, primary winding 6, through the springs 22 and 31, line conductor 10 to the springs 36 and 37, line relay 32, relay springs 38 and 39 to the battery lead 40, thence through battery B to ground G. The line relay 32, upon energizing, presses the springs 41 and 42 into contact. As shown, the line relay 32 is slow-acting—that is, when once energized and the energizing circuit is then broken, the relay does not instantly return to normal position, but remains in its energized position for a short interval. The engagement of the springs 41 and 42 closes an energizing circuit through the trip or plunger magnet 33, which latter operates to attract the plunger arm 43 and thrust the plunger into an idle bank terminal. The plunger magnet circuit extends from ground G′ through the springs 41 and 42, plunger magnet 33 to the battery lead 40, thence through battery B to ground G. When the plunger enters the bank terminal and closes the bank springs 44 and 45 in contact, an energizing circuit is established through the motor magnet relay 46, which latter operates to close the springs 47 and 48 in contact, thereby closing an energizing circuit through the motor magnet 49 of the master switch D. The motor magnet then operates to advance all idle plungers that are in locked engagement with the plunger shaft, bringing them opposite the next idle bank terminals similar to the one just engaged. The circuit through the motor magnet relay 46 extends from ground $G^2$ through the relay 46, common segment 50, master switch bank wiper $49^a$, individual segment 51, conductor 52, through the bank springs 44 and 45 to the battery lead 40, thence through battery B to ground G. The circuit through the magnet 49 extends from ground $G^3$ to the motor magnet 49, interrupter springs 53 and 54, relay springs 47 and 48 to the battery lead 40, thence through battery B and ground G. The motor magnet, upon energizing, attracts its armature 55 and the pawl 56 engages a tooth of the ratchet wheel 57 and moves the latter one step. Prior to this operation the spring 58 engages a notch of the toothed wheel 60, and when the ratchet wheel 57 is given one step the spring 58 slides from the top of the notch and engages the spring 59. The engagement of these two springs provides a new energizing circuit for the motor magnet 49, said circuit extending through the springs 58 and 59 instead of through the springs 47 and 48. Furthermore, the motor magnet when energized separates the interrupter springs 53 and 54, thereby breaking its own circuit in a manner similar to that of a buzzer. The motor magnet 49 continues to operate in this manner as long as the springs 58 and 59 remain in engagement. When the next succeeding tooth on the wheel 60 advances far enough the spring 58 disengages from the spring 59, thereby opening the energizing circuit for the motor magnet. By the time this last notch disengages the springs 58 and 59, the master switch wiper $49^a$ has passed from the first contact point 51 to the second contact point 61. Suppose, however, that when the wiper $49^a$ engages the individual contact 61 there is a guarding potential present. In that event an energizing circuit is closed through the motor magnet relay 46, said circuit extending from the contact 61 to the wiper $49^a$, common segment 50, through the winding of the relay 46 to ground $G^2$, as previously traced. The motor magnet relay again energizes and closes the circuit for the motor magnet. The motor magnet operates as before, and the wiper $49^a$ is carried to the next contact and the next tooth of the wheel 60 operates the springs 58 and 59. This operation continues as long as the wiper $49^a$ continues to find contact segments with protecting potentials. It will be understood, of course, that when the motor magnet 49 thus operates, the plunger shaft and all plungers that are in locking engagement with the said shaft are moved to a new position, and thus brought opposite an idle bank terminal similar to the one engaged by the line switch C. At the instant that the plunger enters the bank terminal the following springs are pressed into contact; 62 and 63, 64 and 65, 66 and 67. The engagement of the springs 62 and 63 extends the calling subscriber's line conductor 10 to the trunk conductor 68, while the engagement of the springs 66 and 67 extends the line conductor 11 to the trunk conductor 69. These conductors 68 and 69 lead to the side switch wipers 70 and 71 of the first selector E. When the line conductors 10 and 11 are thus extended to the first selector E an energizing circuit is established through the line relays 72 and 73 and private magnet relay 81. The relay 72, upon energizing, closes the springs 74 and 75 in contact, and the relay 73, upon energizing, carries the spring 76 out of contact with the spring 77 and into contact with the spring 78. The energizing circuit for the line relays 72, and 73 and private magnet relay 81 extends from ground $G^4$ to the relay 73, side switch wiper 71, trunk conductor 69, bank springs 67 and 66, line conductor 11 thence through the substation 6 to the line conductor 10, as previously explained, bank springs 62 and 63, trunk conductor 68, side switch wiper 70, line relay 72, springs 79 and 80, through the winding of the private magnet relay 81 to the battery lead 40, thence through battery B to ground G. The relay 81 thereupon energizes and separates the springs 87 and 88. The engagement of the springs 76 and 78 provides an energizing circuit for the bridge-cut-off relay 32 in series with the plunger magnet 33 of the line switch C. This circuit extends from ground $G^5$ to the side switch wiper 83, springs 76 and 78, conductor 84, bank springs 65 and 64, bridge-cut-off relay 82, plunger magnet 33 to the battery lead 40, thence through battery B to ground G. The bridge-cut-off relay 82, upon energizing, would operate to disengage the springs 36 and 37, 34 and 35, thereby disconnecting the subscriber's line conductors from the line switch C had not the armature 43 already done so. The trip or plunger magnet 33, also being included in this circuit, retains the plunger arm 43 in an attracted position, and the plunger in the bank terminal. Thus it will be seen that the line switch C, after being operated from the subscriber's station, is maintained in its operated position by a ground connection at the first selector E.

The foregoing is the condition of the central office switches after the calling subscriber removes his receiver from the switch hook, presses and releases the button 19, and before the selector switch E operates for the vertical impulses. When the relay 72 energizes and closes the springs 74 and 75 in contact, an energizing circuit is established through the vertical magnet 85 and the slow-acting relay 86 in multiple. This circuit extends from ground $G^5$ through the side switch wiper 83, springs 76 and 78, springs 75 and 74, springs 89 and 90, through the vertical magnet 85 and slow-acting relay 84 in multiple to the battery lead 40, thence through battery B to ground G. The vertical magnet 85 thereupon energizes and operates to raise the shaft wipers $91^a$, $92^a$, and 93 one step in a vertical direction. The slow-acting relay 86, upon energizing, carries the spring 80 out of engagement with the spring 79 and into contact with the spring 91. When the springs 79 and 80 disengage, the energizing circuit through the line relay 72 and the magnet 12 in series becomes broken, and the relay 72 restores to normal, permitting the springs 74 and 75 to disengage. When the springs 80 and 91 engage, a new energizing circuit is established through the line relay 73, said circuit extending from ground $G^4$ through the relay 73, conductor 92, through the springs 91 and 80, private magnet relay 81 to the battery lead 40, thence through battery B to ground G. The relays 73 and 81, therefore, remain in their energized position. It should also be explained that when the relays 72 and 73 energize, the magnet 12 at the substation A also energizes, thereby attracting its armature 13 and moving the ratchet wheel 14 one step, carrying the pointer 15 to the scale division marked 1. When the relay 72 de-energizes, the springs 74 and 75 disengage; also, the magnet 12, being deprived of its energizing circuit, restores to normal position. The disengagement of the springs 74 and 75 of the line relay 72 breaks the energizing circuit for the vertical magnet 85 and the slow-acting relay 86. The relay 86, therefore, returns to normal position, whereby the spring 80 again engages the spring 79, and the energizing circuit for the line relay 72, in series with the magnet 12 and the line relay 73, is again established. The relay 72, therefore, energizes and presses the springs 74 and 76 into contact, whereby the circuit through the vertical magnet 85 and the slow-acting relay 86 is again established. The magnet 85 operates the switch shaft one more step, and the relay 86 breaks the circuit for the line relay 72 as before. The magnet 12 also operates the second time and the pointer 15 is moved over the scale to the division marked 2. This indicates to the calling subscriber that the selector switch has traveled two vertical steps, and that the shaft wipers $91^a$, $92^a$ and 93 have been raised to the second level, opposite the trunk line conductors which lead to the connector switch F. It should be stated that if necessary the relay 72 may be made slow-acting to any suitable degree.

The subscriber at substation A then presses the button 19, whereby the spring 21 is carried out of engagement with the spring 22 and into engagement with the spring 20. This operation breaks the circuit through the magnet 12 and bridges the resistance coil 29 across the line conductors 10 and 11. When this resistance enters the circuit in series with the line relays 72 and 73 and the private magnet relay 81, sufficient current does not flow to maintain the relay 81 in its operated position. It therefore restores to normal and the springs 87 and 88 engage, whereby a circuit is closed through the private magnet 94. This circuit extends from ground $G^5$ through the side switch wiper 83, springs 88 and 87, conductor 95, through the winding of the private magnet 94, normal springs 96, 97 and 98, through the winding of the release magnet 99 to the battery lead 40, thence through battery B to ground G. The private magnet 94 has a sufficient high resistance to prevent enough current from flowing over this circuit to operate the release magent 99. The depression of the button 19 also disengages the dog 18 from the ratchet wheel 14, thereby allowing the indicator 15 to be restored to normal position in the manner explained in connection with Figs. 3, 4 and 5.

When the button 19 is restored to normal position sufficient current again flows to energize the relay 81, which thereupon operates to disengage springs 87 and 88, whereby the energizing circuit for the private magnet 94 is broken. The private magnet, upon energizing, operates the springs 89 and 90, so that when the relay 72 energizes after the button is pressed an impulse will not be transmitted to the vertical magnet 85. The private magnet, as is well known, upon energizing and deenergizing, permits the side switch to pass from first to second position, whereby when the wiper 100 engages the contact point 101 an energizing circuit is established through the rotary magnet 102. The rotary magnet then operates to rotate the shaft wipers $91^a$, $92^a$ and 93 of the selector E into engagement with the first contact of the second level of the selector banks, from which contacts it is assumed the trunk line conductors 103, 104 and 105 lead to the connector switch F (Fig. 2). If the first trunk line is busy, however, and the wipers have to pass over busy contacts, then as soon as the private wiper 93 engages the first private bank contact the private magnet 94 is again energized and the side switch is locked in second position. The energizing circuit for the said private magnet extends from the grounded terminal G of the battery B through an occupying switch (not shown), through the private wiper 93, side switch wiper 106, contact point 107, then through the private magnet 94 and normal springs 96, 97 and 98, release magnet 99 to the battery lead 40, thence through battery B to ground G. The private magnet 94, upon thus becoming energized, locks the side switch wiper 100 in engagement with the contact point 101, whereby the rotary magnet 102 will be energized step by step until the wipers are carried beyond the last busy trunk line. At the instant that the private wiper 93 leaves the last busy contact point the energizing circuit through the private magnet 94 is destroyed, and as a result the selector side switch passes to third position. If there are no busy trunk lines the rotary magnet 102 releases the side switch to third position as soon as the wipers are carried into engagement with the first trunk line. As soon as the side switch passes to third position, as stated, the subscriber's line conductors 10 and 11 are extended to the trunk conductors 103 and 104 which, in this case, it is assumed lead to the connector switch F. The extending of the line occurs, of course, as soon as the side switch wipers 70 and 71 engage the contact points 108 and 109, respectively. Also, when the side switch wiper 106 engages the third-position contact point the guarding potential is established at the private bank contact corresponding to the trunk line conductors 103 and 104 for protecting the said trunk line against interference by another calling subscriber. The wipers of the side switch are broad enough to bridge across the space between the contacts, so that the battery is not disconnected from the line while the side switch is moving from one position to the other. When the subscriber's line conductors are thus extended to the connector switch F an energizing circuit is established through the line relays 110 and 111 and private magnet relay 118 in the same manner in which the energizing circuit was established through the line relays 72 and 73 and private magnet relay 81 of the selector switch E when the subscriber's line conductors 10 and 11 were extended to the trunk condutors 68 and 69 through the line switch bank. The circuit through the line relays 110 and 111 and private magnet relay 118 extends from ground $G^6$ through the relay 111, trunk conductor 104, shaft wiper $92^a$, side switch wiper 71, trunk conductor 69, thence through the substation A to the trunk conductor 68, as previously traced, side switch wiper 70, shaft wiper $91^a$, trunk conductor 103, line relay 110, springs 116 and 117, through the winding of the private magnet relay 118 to the battery lead 40, thence through battery B to ground G. The relay 110, upon energizing, closes the springs 112 and 113 in contact: the relay 11, upon energizing, separates the springs 114 and 115, and the private magnet relay 118, when energized separates the springs 119 and 120.

The engagement of the springs 112 and 113 provides an energizing circuit for the vertical magnet 121 and the slow-acting relay 122 in multiple. This circuit extends from ground $G^7$ to the springs 112 and 113, springs 123 and 124, side switch wiper 125, thence through the vertical magnet 121 in multiple with the relay 122 and the rotary magnet 126 in series to the battery lead 40, thence through battery B to ground G. The vertical magnet thereupon energizes and operates the switch shaft to carry the switch shaft wipers 127, 128 and 129 one step in a vertical direction. It should be stated that if necessary the relay 110 may be made slow-acting to any suitable degree. Although the rotary magnet 126 is included in the circuit with the slow-acting relay 122 it does not operatively energize, since the said magnet is of comparatively low resistance. The relay 122, however, energizes to separate the spring 117 from the spring 116 and carries the spring 117 into engagement with the spring $127^a$. When the springs 116 and 117 disengage, the energizing circuit for the line relay 110 and the magnet 12 at the station A is broken. The relay 110 and the magnet 12 therefore restore to normal position. When the springs 117 and $127^a$ engage, a new energizing circuit is provided for the line relay 111, said circuit extending from ground $G^9$ through the relay 111, springs $127^a$ and 117, private magnet relay 118 to the battery lead 40, thence through battery B to ground G. The disengagement of the springs 112 and 113, when the relay 110 restores to normal, breaks the energizing circuit for the vertical magnet 121 and the slow-acting relay 122. After a moment the slow-acting relay 122 restores the spring 117 to normal engagement with the spring 116, whereby the circuit is provided for the line relay 110 in series with the magnet 12 of the substation A and the line relay 111, together with the private magnet relay 118. The line relay 110 again energizes and places the springs 112 and 113 in contact, whereby a second energizing circuit is established through the vertical magnet 121 and the slow-acting relay 122 as before explained. The vertical magnet operates as before, and the shaft wipers 127, 128 and 129 are raised a second step and brought opposite the second bank level. The substation magnet 12, upon energizing the second time, moves the pointer 15 opposite the number 2 on the scale, thereby indicating to the subscriber that the connector switch has operated for the second digit 2 of the desired number.

As shown in the drawings, the magnet 12 at the substation will be energized and the pointer moved one step as soon as the button 19 is released after the first digit is called. In case the wipers of the selector E have to rotate over several busy trunks, this movement of the indicator would take place a short time before the vertical magnet of the connector F is energized, and if the digit to be called were 1 the subscriber might press his button before the connector has time to operate. This would not result if any other digit than 1 were called, because the magnet 12 at the substation would not be energized a second time until the shaft of the connector had actually been stepped up two steps. It will thus be understood that the possibility of the subscriber pressing his button too early may be entirely eliminated if the first levels of the connector banks are left blank, i. e., have no line connectors, or, what amounts to the same thing, if the banks are so arranged that it requires two vertical steps of the shaft to raise the wipers to a position opposite the first bank level. In such case there would be no subscribers' numbers whose tens digit is 1, and consequently there would be no danger of the calling subscriber pressing his button before the connector has operated the number of times indicated by the pointer.

After the pointer reaches the No. 2 position on the scale the button 19 is again pressed to stop the vertical impulses and to step the side switch from first to second position. When the button 19 is pressed the springs 21 and 20 engage, thereby bridging the resistance coil 29 across the line conductors 10 and 11. The relay 110 again energizes when the slow-acting relay 122 restores to normal position with the spring 117 in contact with the spring 116, but with the resistance coil 29 bridged across the line conductors 10 and 11 in series with the line relays 110 and 111 and the private magnet relay 118, sufficient current does not flow to maintain the relay in its operated position. The springs 119 and 120 therefore engage and close an energizing circuit through the private magnet 130 in multiple with the slow-acting relay 131. This circuit extends from ground $G^8$ through the springs 119 and 120, normal springs 132 and 133, side switch wiper 134, contact point 135, slow-acting relay 131 in multiple with the private magnet 130 to the battery lead 40, thence through battery B to ground G. The relay 131, upon energizing, separates the springs 123 and 124.

When the button 19 restores to normal the resistance coil 29 is cut out of the line circuit, and permits sufficient current to flow so that the relay 118 again energizes and breaks the energizing circuit for the private magnet 130. The private magnet, upon energizing and de-energizing, permits the side switch wipers to pass from first to second position. Furthermore, when the button 19 is pressed the dog 18 is carried out of engagement with the teeth on the ratchet wheel 14, and the spring 17 again restores the ratchet wheel 14 and the pointer 15 to normal position. After the energizing circuit through the private magnet 130 and the slow-acting relay 131 is broken the springs 123 and 124 engage, and an energizing circuit is now established through the rotary magnet 126 in multiple with the relay 122 and the vertical magnet 121 in series. This circuit extends from ground $G^7$ to the springs 112 and 113, springs 123 and 124, side switch wiper 125, contact point 136 to the rotary magnet 126, thence to the battery lead 40; also, from the contact point 136 through the slow-acting relay 122 and the vertical magnet 121 in series to the battery lead 40, thence through battery B to ground G. The vertical magnet 121 being of comparatively low resistance does not operatively energize when in series with the relay 122. The slow-acting relay 122, however, operates as before to carry the spring 117 out of contact with the spring 116 and into contact with the spring $127^a$. The disengagement of the springs 116 and 117, as previously explained, breaks the energizing circuit for the line relay 110 and the magnet 12 of the substation A. The relay 110, therefore, de-energizes and breaks the energizing circuit for the rotary magnet 126 and the slow-acting relay 122. The slow-acting relay 122, after a short interval, also de-energizes and permits the spring 117 to engage the spring 116, thereby again restoring the energizing circuit for the line relay 110 and the magnet 12, as previously explained. The energizing circuit for the rotary magnet 126 and the slow-acting relay 122 is again established when the line relay springs 112 and 113 engage. Thus the rotary magnet 126 is given two steps and the wipers 127, 128 and 129 are carried onto the second contact of the second level. Also, the pointer 15 of the substation indicating device now rests opposite the number 2, indicating to the subscriber that two of the rotary impulses have operated at the connector. When the relay 122 energizes, the circuit for the line relay 110 and the magnet 12 is again broken. This intermittent energizing and de-energizing of the line relay 110 and the magnet 12 continues until the pointer 15 reaches the division indicated by 0 on the scale. This indicates to the calling subscriber than ten impulses have been sent for the last digit 0, whereby the wipers 127, 128 and 129 have been carried into contact with the last bank contact points of the second level, from which the normal conductors 137 and 138 lead to the line conductors of the called substation The button 19 is again pressed, bridging the resistance coil 29 across the line conductors 10 and 11, and again permitting the private magnet relay 118 to restore to normal position, whereby the springs 119 and 120 again engage and re-establish the energizing circuit for the private magnet 130 in multiple with the slow-acting relay 131. The private magnet 130 energizes and de-energizes as before, permitting the side switch wipers to pass from second to third position. When the side switch wiper 139 passes to third position a guarding potential is established at the shaft private wiper 129 for protecting the called line against seizure by some other calling subscriber. This potential extends from ground through the side switch wiper 139 and conductor 140 to the shaft wiper 129. An energizing circuit is also established through the bridge-cut-off relay 141 of the line switch C′. This circuit extends from ground through the side switch wiper 139 to the shaft wiper 129, conductor 142 to the bridge-cut-off relay 141, to the trip or plunger magnet 143, thence to the battery lead 40, and through battery B to ground G. The bridge-cut-off relay 141 is of comparatively high resistance, and the trip or plunger magnet 143 does not operatively energize when in normal position. The relay 141, upon energizing, operates to disconnect the normal conductors 137 and 138 from the line switch C′.

The subscriber's line conductors 10 and 11 having been extended to the subscriber's normal conductors 137 and 138 through the condensers 144 and 143, the calling subscriber now presses the button 19 to energize the ringer relay 146, whereby the terminals of the ringer generator H are bridged across the terminals of the called line to signal the subscriber at substation A′. When the button 19 is pressed the relay 118 again de-energizes as before, permitting the springs 119 and 120 to engage, whereby an energizing circuit is now established through the ringer relay 146, said circuit extending from ground $G^8$ through the springs 119 and 120, normal springs 132 and 133, side switch wiper 134, contact point 147, through the winding of the ringer relay 146, springs 148 and 149 to the battery lead 40, thence through battery B to ground G. When the ringer relay energizes, the springs 150 and 151 are carried into contact with the springs 152 and 153, thereby sending a ringing current from the ringer generator H through the springs 152 and 150, side switch wiper $153^a$ shaft wiper 127, normal conductor 137, line conductor 154, condenser 155 and ringer 156, springs 157 and 158 to the line conductor 159, normal conductor 138, shaft wiper 128, side switch wiper 160, then through the ringer relay springs 151 and 153 back to the ringer generator H. In response to the signal the called subscriber removes the receiver from the switch hook and presses and releases the button 161. When the button 161 is pressed the lock 162 is carried out of engagement with the switch hook 163, and the switch hook rises, carrying the springs 158 and 164 into contact, thereby closing the primary circuit for the substation A′. The transmitter 165 of the substation A′ is provided with battery current from ground $G^9$ through the relay 166, through the ringer relay springs and side switch wiper to the normal conductor 138, line conductor 159, springs 158 and 164, through the magnet 167, transmitter 165, primary winding 168, springs 169 and 170 to the line conductor 154, normal conductor 137, through the shaft and side switch wipers, ringer relay springs and relay 171 to the battery lead 40, thence through battery B to ground G. The transmitter 7 of the calling substation A is provided with talking current through the line relays 110 and 111 and private magnet relay 113, as previously traced. The two substations being thus connected, conversation may be carried on over the conductors indicated by the heavy lines in Figs. 1 and 2.

The release of the central office switching apparatus is brought about by the subscriber who restores his receiver to the switch hook last. Suppose, for example, that the subscriber at substation A′ has restored his receiver; then the relays 171 and 166 restore to normal position, placing the springs 148 and 149 in contact. The release of the switches is then brought about when the subscriber at substation A restores his receiver to the switch hook. When this occurs the springs 24 and 26 disengage, thereby breaking the energizing circuit which includes the line relays 110, 111 and private magnet relay 118 of the connector switch F. When the switch hook 3 reaches its lowermost position the locking member 23 passes over the top of the switch hook 3, as shown in Fig. 2, and locks the switch hook in its downward position. Also, when the switch hook is moved about its pivot point 172 the rod 173 rotates the shaft 31 and carries the dog 18 out of engagement with the ratchet wheel 14. When the springs 24 and 26 disengage and break the energizing circuit for the line relays 110, 111, and private magnet relay 118, as explained, the said relays restore to normal position, whereby the springs 114 and 115 now engage and close an energizing circuit through the release magnet $140^a$ of the connector F in series with the release relay $173^a$ of the selector switch E. This circuit extends from ground $G^{10}$ through the release relay $173^a$, side switch wiper 106, shaft wiper 93, conductor 105, springs 115 and 114, through the normal springs 175 and 176, release magnet $140^a$, springs 148 and 149 to the battery lead 40, thence through battery B to ground G. The release magnet $140^a$ attracts its armature and restores the connector side switch to first position, and the connector switch shaft and wipers 127, 128 and 129 are restored to normal. When the shaft reaches its normal position the normal arm 177 upon the shaft carries the springs 176 and 133 out of engagement with the springs 175 and 132. The disengagement of the springs 175 and 176 breaks the energizing circuit for the release magnet $140^a$. The release relay $173^a$ of the selector switch E also energizes in series with the release magnet $140^a$ and operates to close the springs 178 and 179 in contact, thereby closing an energizing circuit through the release magnet 99, said circuit extending from ground $G^{11}$ to the springs 178 and 179, release magnet 99 to the battery lead 40, thence through battery B to ground G. The release magnet 99 thereupon energizes, restoring the selector side switch and shaft wipers to normal position. When the shaft reaches normal position the normal arm 180 upon its end disengages the springs 96, 97 and 98. When the selector side switch restores to normal position the holding circuit through the bridge-cut-off relay 82 and plunger magnet 33 is broken. It will be seen that after the selector side switch passes to third position the holding circuit for the plunger magnet 33 extends from ground to the side switch wiper 100, contact point 181, conductor 84, bank springs 65 and 64, bridge-cut-off relay 82, plunger magnet 33 to the battery lead 40, thence through battery B to ground G. Now, when the side switch wiper 100 restores to normal position this circuit is broken and the relay 82 and release magnet 33 de-energize, whereby the arm 43 restores to normal position, permitting the springs of the bank terminal to restore to normal position. The calling subscriber thus, upon hanging his receiver 2 upon the switch hook 3, opens the primary circuit at the springs 24 and 26, whereby the line relay 111 of the connector switch F is de-energized, bringing about the release of the central office switching apparatus, as explained.

If the calling subscriber should restore his receiver to the switch hook first, then the circuit for the release magnet $140^a$ is closed in a somewhat different manner. It was explained that when a calling subscriber restores his receiver to the switch hook the line relay 111 de-energizes and permits the springs 114 and 115 to engage; but if the called subscriber at station A′ still has his receiver off the switch hook, thus maintaining the energizing circuit for the relays 166 and 171, the circuit for the release magnet $140^a$ is not closed. When the receiver at substation A′ is restored, the relay 171 de-energizes, permitting the springs 148 and 149 to engage, whereby the energizing circuit for the release magnet $140^a$ is now completed. The release magnet energizes in series with the back-release relay of the selector switch E and produces the release of the central office switching apparatus, as previously explained.

In the foregoing it has been pointed out how a subscriber might operate the central office switches to establish connection with another subscriber's line. Suppose, for example, that when the subscriber at substation A calls the subscriber at station A′ the line is busy—that is, another subscriber has called station A′, or the subscriber at substation A′ has made a call to some other station. In either event a guarding potential will be established at the private bank contact in the connector bank corresponding to the line of substation A′. Then, after the connector switch F is operated for the last digit 0, and the push button 19 is pressed to step the connector side switch wipers from second to third position, an energizing circuit is established through the private magnet 130 and relay 131, and the side switch is locked in second position. This is brought about as follows: When the button 19 is pressed the private magnet 130 energizes as before, and closes the springs 182 and 183 and 184 and 185 in contact. When the springs 182 and 183 engage, a locking circuit is established for the private magnet 130 and relay 131, said circuit extending from the grounded private bank contact to the shaft wiper 129, conductor 140, side switch wiper 139, contact point 186 (bearing in mind that the side switch is now in second position) to the springs 182 and 183, private magnet 130 in multiple with the relay 131 to the battery lead 40, thence through battery B to ground G. The private magnet and relay 131 are thus energized and the side switch is locked in second position, and the subscriber's line is not extended to the normal conductors of the desired line. The busy signal, however, is given the calling subscriber, indicating this condition. The busy signal current passes from the secondary winding of the busy machine I to the springs 185 and 184, condenser 145, trunk conductors 104 and 69, line conductor 11, through the substation A to the line conductor 10, trunk conductors 68 and 103, through the relay 110, springs 116 and 117, private magnet relay 118 to the battery lead 40, thence to the secondary winding again. The calling subscriber is thus notified that the desired line is now in use and, upon hanging up the receiver, brings about the release of the switches in the usual manner.

In regard to the action of the relay 86, it may be added that the springs are so adjusted that when the relay is energized the spring 80 makes contact with the spring 91 before leaving the spring 79. Otherwise the circuit through the relays 73 and 81 would be momentarily broken each time the vertical magnet and the relay 86 are energized. The magnets and relays in the system may be adjusted to any suitable degree, and may be made slow or fast to any suitable extent if desired.

Means are also provided at each connector whereby the called subscriber can signal the exchange attendant in case a connector is in connection with the line for a long time, or in case the subscriber is being annoyed by other subscribers. This is accomplished by the relays 166 and 171 in connection with the button 161. When the button 161 is pressed the high resistance is inserted in the line circuit, whereby sufficient current does not flow to hold the relay 166 in an operated position. It accordingly falls back and cuts battery to an alarm or other device such as the lamp 198, which will attract the attention of the attendant to this connector.

From the foregoing it will be seen that I provide a system in which automatic trunking and connecting operations are accomplished without the provision of any means for transmitting impulses over the lines from the substations thereof. To the contrary the make-and-break devices for transmitting the electrical impulses are located at the exchange or central station, and while these impulses are being transmitted over the line circuit, the latter remains closed at the substation thereof, the said substation being provided with devices for merely checking or stopping the transmission of impulses as soon as the automatic switch that is operating in response thereto has reached a desired or predetermined point in its operation, which predetermined point always corresponds to a digit of the called number. In this way a selector always stops at a level corresponding to a digit of the called number, and then rotates automatically to find an idle trunk in the predetermined group. A connector, however, as herein disclosed, is not only stopped at a predetermined point in its vertical operation, so as to select a predetermined group of subscribers, but is also stopped at a predetermined point in its rotary operation, whereby connection is made with the called line. During the vertical operation of a selector the calling subscribed is doing nothing, as at such time the system is operating automatically, and is not under the control of the calling subscriber. This is also true when a connector is operating vertically, and is true while the connector is operating in a rotary manner to find the called line. All of the acts of the calling subscriber are merely for the purpose of stopping the switches at the predetermined or desired points in their operations, and are not for the purpose of causing the switches to operate, with the exception, of course of the initial act of the subscriber which causes the line switch to operate. The numerical switch, to-wit, the selectors and connectors, are each adapted to automatically respond as soon as connection is made therewith—that is to say, the mere seizure of the idle trunk line causes the selector or connector at the other end thereof to begin to operate, and its operation continues until stopped or interrupted by reason of some positive act on the part of the calling subscriber, and not because the calling subscriber has ceased to do something. The indicator at the calling substation is responsive to the vertical operations of the selectors, but not to the rotary operations thereof. The said indicator is, however, responsive to both the vertical and rotary operations of the connector, as previously explained. Thus the indicator at the calling substation responds and operates in synchronism with all of the numerical switch operations at the exchange or central station. The calling subscriber stops the indicator and the switch that is operating in synchronism therewith at a point in the operation thereof corresponding to the digit of the called number. As shown, the act of the subscriber which stops the operation at the required moment is performed after the requisite degree of operation has taken place, and the stoppage of the switching operation occurs simultaneously with the act of the subscriber. For the broader purposes of my invention, however, the act of the subscriber which stops the switch at the desired point in its operation may occur either before or after the said operation. As disclosed, the acts of the calling subscriber alternate with the successive operations of the switches, and this is true regardless of whether the act of the subscriber for stopping the operation of the switch precedes or follows that operation.

It will also be seen that by my invention I provide a two-wire system—that is to say, a system which is free from operating grounds at the substations thereof—in which the subscribers' lines are provided with non-numerical trunking switches, and in which provision is made whereby the taking down of the receiver at the calling substation does not result in the seizure of a trunk or trunk line at the central station. In this way, and notwithstanding that the switches are controlled over complete metallic line circuits, the calling subscriber cannot take down his receiver and monopolize a trunk line for some time before completing the call. With my improved arrangement no trunk line is seized until after the calling subscriber has pushed the button and thereby started the operation of the system to extend the call toward the called subscriber.

In addition it will be seen that provision is made for enabling a called subscriber to signal an attendant at the exchange or central station without disconnecting his line from the line of the calling subscriber. In this way the called subscriber can always ascertain from where the call came—that is to say, can always ascertain the number of the calling subscriber. This is of advantage for various reasons, as, for example, in cases where one subscriber annoys another by persistently calling him up for no other reason. In such case, and with my improved arrangement, the subscriber thus annoyed may signal the attendant at the exchange or central station without releasing the connection. The said attendant, upon communicating with the called subscriber, can then trace the call back through the exchange to the line and substation from whence it came. Thus any called subscriber always has it within his power to retain the connection and thereby ascertain from whence the call came. A calling connection is always released by the subscriber who hangs up his receiver last.

What I claim as my invention is:

1. In a two-wire or metallic circuit controlled trunking system, trunk lines, a switch for selecting a trunk, means at the substation separate from the switch hook normally tending to control said switch to cause it to seize a trunk by the initial closure of a metallic circuit by a calling subscriber, and means for preventing this operation.

2. In a telephone system, a line circuit, means for performing a series of numerical switching operations, one for each digit of the called number, to extend connection toward the called subscriber, devices at the exchange or central station for transmitting impulses over the line circuit to operate said means, and a controller mechanism by the initial operation of which the calling party stops the transmission of said impulses in accordance with the digits of the called number, said mechanism being at rest while the impulses are being transmitted over the line, and the acts of the calling party for limiting said impulses alternating with the numerical switching operations at the exchange or central station.

3. In a telephone system, means having motion in two intersecting planes for performing a series of numerical switching operations, one for each digit of the called number, to extend connection toward the called subscriber, a substation mechanism at the calling substation responsive to each switching operation, operating in synchronism therewith, and means the initial operation of which variably limits the operation of said mechanism, whereby the calling party controls the extent of said operations.

4. In a telephone system, means for performing a series of numerical switching operations, one for each digit of the called number, to extend connection toward the called subscriber, a visual indicator operating in synchronism with each of said operations, and mechanism the initial operation of which stops said indicator at any point in its operation, whereby the calling party may observe and control the said switching operations.

5. In a telephone system, a series of switches, means for automatically operating said switches to extend connection toward the called subscriber, and a mechanism by the initial operation of which the calling party terminates the operation of each switch in accordance with a digit of the called number, said mechanism being at rest during the actual operation of any switch, the actuation of said mechanism by the calling party alternating with the operations of said switches.

6. In a telephone system, an automatic two-motion switch, a metallic line circuit therefor, means at the switch for opening and closing said metallic line circuit to cause a step-by-step operation of said switch, and means by which the calling party controls the extent of operation of said switch after said switch has started in operation.

7. In a telephone trunking system, a metallic line circuit, an automatic switch having vertical step-by-step motion to select a group and rotary motion to find an idle trunk in the predetermined group, and automatic means at said switch for controlling the two sides of said line circuit to cause the said vertical motion.

8. In a telephone system, a line circuit an automatic switch having vertical step-by-step motion to select a group and rotary motion to find the called line in the predetermined group, and automatic means at said switch for controlling the two sides of the line circuit in series to cause the said vertical and rotary motion.

9. In a telephone system, subscribers' metallic line circuits, automatic switches, devices at the exchange or central station for automatically controlling said metallic line circuits to cause the operation of said switches, indicating means at the substations responsive to each switching operation, and means at the substations by which the subscribers control the extent of operation of said switches in accordance with the digits of called numbers.

10. In a telephone trunking system, trunk lines divided into groups, means for automatically selecting groups and means for selecting an idle trunk in a predetermined group, a line circuit automatically controlled at the exchange or central station to cause the group-selecting operation, and means by which the calling party controls the line circuit to terminate said operation in accordance with a digit of the called number after said switch has started in operation.

11. In a telephone system, means controllable by the calling subscriber for automatically extending connection from the calling line to the called line, said means being controlled exclusively over the two sides of the calling line in series to select the called line, and means for releasing the connection controllable only by the subscriber who hangs up his receiver last.

12. In a telephone system, automatic means controllable by the calling subscriber for finding and extending connection to the line of the called subscriber, means for releasing controllable only by the subscriber who hangs up his receiver last, a central station signal responsive only to the called subscriber, and means for preventing a release of the connection when the called subscriber operates the said signal.

13. In a system for establishing complete metallic talking circuits between calling and called subscribers, a line circuit, means for performing a series of numerical switching operations, one for each digit of the called number, to extend connection towards the called subscriber, devices at the exchange or central station for transmitting impulses over the line circuit to operate said means, and a controller mechanism by which the calling party limits the said impulses in accordance with the digits of the called number, said mechanism being at rest while the impulses are being transmitted over the line, and the acts of the calling party for limiting said impulses alternating with the numerical switching operations at the exchange or central station, said system being controllable over the two sides of the subscriber's line in series.

14. In a system for establishing complete metallic talking circuits between calling and called subscribers, means for performing a series of numerical switching operations one for each digit of the called number, to extend connection toward the called subscriber, a substation mechanism responsive to each switching operation, operating in synchronism therewith, and means for variably limiting the operation of said mechanism, whereby the calling party controls the extent of said operations, said system being controllable over the two sides of the subscriber's line in series.

15. In a system for establishing complete metallic talking circuits between calling and called subscribers, means for performing a series of numerical switching operations, one for each digit of the called number, to extend connection toward the called subscriber; a visual indicator operating in synchronism with each of said operations, and mechanism for stopping said indicator at any point in its operation, whereby the calling party may observe and control the said switching operations, said system being controllable over the two sides of the subscriber's line in series.

16. In a system for establishing complete metallic talking circuits between calling and called subscribers, a series of switches, means for automatically operating said switches to extend connection toward the called subscriber, and a mechanism by which the calling party terminates the operation of each switch in accordance with a digit of the called number, said mechanism being at rest during the actual operation of any switch, the actuation of said mechanism by the calling party alternating with the operations of said switches, said system being controllable over the two sides of the subscriber's line in series.

17. In a system for establishing complete metallic talking circuits between calling and called subscribers, an automatic switch, a line circuit therefor, means at the switch for opening and closing the line circuit to cause a step-by-step operation of said switch, and means by which the calling party controls the extent of operations of said switch, said system being controllable over the two sides of the subscriber's line in series.

18. In a system for establishing complete metallic talking circuits between calling and called subscribers, a line circuit, an automatic switch having vertical step-by-step motion to select a group and rotary motion to find an idle trunk in the predetermined group, and automatic means at said switch for controlling the line circuit to cause the said vertical motion, said system being controllable over the two sides of the subscriber's line in series.

19. In a system for establishing complete metallic talking circuits between calling and called subscribers, a line circuit, an automatic switch having vertical step-by-step motion to select a group and rotary motion to find the called line in the predetermined group, and automatic means at said switch for controlling the line circuit to cause the said vertical and rotary motion, said system being controllable over the two sides of the subscriber's line in series.

20. In a system for establishing complete metallic talking circuits between calling and called subscribers, subscribers' line circuits, automatic switches, devices at the exchange or central station for automatically controlling said line circuits to cause the operation of said switches, and means at the substations by which the subscribers control the extent of operation of said switches in accordance with the digits of called numbers, said system being controllable over the two sides of the subscriber's line in series.

21. In a system for establishing complete metallic talking circuits between calling and called subscribers, trunk lines divided into groups, means for automatically selecting a group and for selecting an idle trunk in a predetermined group, a line circuit automatically controlled at the exchange or central station to cause the group-selecting operation, and means by which the calling party controls the line circuit to terminate said operation in accordance with a digit of the called number, said system being controllable over the two sides of the subscriber's line in series.

22. In a system of telephonic transmission between calling and called subscribers, a line circuit, means for performing a series of numerical switching operations, one for each digit of the called number, to extend connection toward the called subscriber, devices at the exchange or central station for transmitting impulses over the line circuit to operate said means, a controller mechanism by which the calling party limits the said impulses in accordance with the digits of the called number, said mechanism being at rest while the impulses are being transmitted over the line, and the acts of the calling party for limiting said impulses alternating with the numerical switching operations at the exchange or central station, and substation transmitters connected to receive talking current from the exchange or central station.

23. In a system of telephonic transmission between calling and called subscribers, means for performing a series of numerical switching operations, one for each digit of the called number, to extend connection toward the called subscriber, a substation mechanism responsive to each switching operation, operating in synchronism therewith, means controlled by the calling subscriber for variably limiting said switching operation whereby the calling party controls the extent of said operations, and substation transmitters connected to receive talking current from the exchange or central station.

24. In a system of telephonic transmission between calling and called subscribers, means for performing a series of numerical switching operations, one for each digit of the called number, to extend connection toward the called subscriber, a visual indicator operating in synchronism with each of said operations, mechanism for stopping said indicator at any point in its operation, whereby the calling party may observe and control the said switching operations, and substation transmitters connected to receive talking current from the exchange or central station.

25. In a system of telephonic transmission between calling and called subscribers, a series of switches, means for automatically operating said switches to extend connection toward the called subscriber, a mechanism by which the calling party terminates the operation of each switch in accordance with a digit of the called number, said mechanism being at rest during the actual operation of any switch, the actuation of said mechanism by the calling party alternating with the operations of said switches, and substation transmitters connected to receive talking current from the exchange or central station.

26. In a system of telephonic transmission between calling and called subscribers, a line circuit, an automatic switch having vertical step-by-step motion to select a group and rotary motion to find an idle trunk in the predetermined group, automatic means at said switch for controlling the line circuit to cause the said vertical motion, and substation transmitters connected to receive talking current from the exchange or central station.

27. In a system of telephonic transmission between calling and called subscribers, a line circuit, an automatic switch having vertical step-by-step motion to select a group and rotary motion to find the called line in the predetermined group, automatic means at said switch for controlling the line circuit to cause the said vertical and rotary motion, and substation transmitters connected to receive talking current from the exchange or central station.

28. In a system of telephonic transmission between calling and called subscribers, subscribers' line circuits, automatic switches, devices at the exchange or central station for automatically controlling the two sides of said line circuits in series to cause the operation of said switches, means at the substations by which the subscribers control the extent of operation to said switches in accordance with the digits of the called numbers, and substation transmitters connected to receive talking current from the exchange or central station.

29. In a system of telephonic transmission between calling and called subscribers, trunk lines divided into groups, means for automatically selecting a group and for selecting an idle trunk in a predetermined group, a line circuit automatically controlled at the exchange or central station to cause the group-selecting operation, means by which the calling party controls the line circuit to terminate said operation in accordance with a digit of the called number, and substation transmitters connected to receive talking current from the exchange or central station.

30. In a telephone system, an automatic selector switch provided with a plurality of relays, the first and second of said relays being normally in bridge of the line circuit, a circuit including the winding of the first relay in series with the winding of the third relay, means whereby the first and fourth relays cooperate to transmit electrical impulses over the line circuit, a magnet at the substation, indicating means operated by said magnet in response to said impulses, release mechanism for said selector, means for releasing said switch, and a resistance at the substation for preventing premature operation of said release mechanism.

31. In a telephone system, an automatic connector switch provided with means for finding the called subscriber's line, a plurality of relays for said connector, the first and second of said relays being bridged across conductors of the talking circuit, a circuit including the winding of the first relay in series with a winding of the third relay, means whereby the first and fourth of said relays cooperate to transmit electrical impulses over the line circuit, a magnet at the substation, indicating means operated by said magnet in response to said impulses, release mechanism for said connector, means for releasing said switch, and a resistance at the substation for preventing premature operation of said release mechanism.

32. In a telephone system, a trunk line, an automatic switch, a relay for said switch included in a bridge across said trunk, an operating magnet and a slow acting relay controlled by said first mentioned relay; and means controlled by said slow acting relay for controlling said first mentioned relay.

33. In a telephone system, an automatic switch, a relay for said switch, a magnet for controlling said switch controlled by said relay, and a slow acting relay controlling said first mentioned relay, which slow-acting relay in turn is controlled by said first-mentioned relay.

34. In a telephone system, a line circuit, an automatic switch, means for connecting said switch with said line circuit, a pair of relays in bridge of said line circuit, a third relay in said bridge, an operating magnet for said switch controlled by one of said first mentioned relays, and means controlled by said third relay for preventing the operation of said magnet.

35. In a telephone system, a trunk line, an automatic switch, a relay for said switch included in a bridge across said trunk, an operating magnet and a slow acting relay controlled by said first mentioned relay, means controlled by said slow acting relay for controlling said first mentioned relay, and indicating means at the substation responsive to the operation of said switch.

36. In a telephone system, an automatic switch, a relay for said switch, a magnet for controlling said switch controlled by said relay, a slow acting relay controlling said first mentioned relay, and indicating means at the substation responsive to the operation of said switch.

37. In a telephone system, a line circuit, an automatic switch, means for connecting said switch with said line circuit, a pair of relays in bridge of said line circuit, a third relay in said bridge, an operating magnet for said switch controlled by one of said first mentioned relays, and means at the substation for controlling said third relay to prevent the operation of said magnet.

38. In a telephone system, trunk lines divided into groups, an automatic switch having motion in one plane to select a group and motion in a plane at right angles thereto to find a line in a selected group, a relay for said switch included in a bridge across said trunk, an operating magnet and a slow acting relay controlled by said first mentioned relay, and means controlled by said slow acting relay for controlling said first mentioned relay.

39. In a telephone system, trunk lines divided into groups, an automatic switch having motion in one plane to select a group, and motion in a plane at right angles thereto to find a line in a selected group, a relay for said switch included in a bridge across said trunk, an operating magnet and a slow acting relay controlled by said first mentioned relay, means controlled by said slow acting relay for controlling said first mentioned relay, and indicating means at the substation responsive to the operation of said switch.

40. In a telephone system, lines divided into groups, an automatic switch having motion in one plane to select groups, and motion in a plane at right angles thereto to find a line in a selected group, a relay for said switch, a magnet for controlling said switch controlled by said relay, and a slow acting relay also controlled by said first mentioned relay, which in turn is controlled by said slow acting relay.

41. In a telephone system, lines divided into groups, an automatic switch having motion in one plane to select groups, and motion in a plane at right angles thereto to find a line in a selected group, a relay for said switch, a magnet for controlling said switch controlled by said relay, a slow acting relay also controlled by said first mentioned relay, which in turn is controlled by said slow acting relay, and indicating means at the substation responsive to the operation of said switch.

42. In a telephone system, lines divided into groups, an automatic switch having motion in one plane to select groups, and motion in a plane at right angles thereto to find a line in a selected group, a pair of relays in bridge of said line selected, a third relay in said bridge, an operating magnet for said switch controlled by one of said first mentioned relays, and means at the substation for controlling said third relay to prevent the operation of said magnet.

43. In a telephone system, subscribers' lines divided into groups, a selector switch having motion in one plane to select groups, and motion in a plane at right angles thereto to select a line in a selected group, a line relay and a slow acting relay adapted to control the said vertical motion, and means controlled at the substation for preventing this operation.

44. In a telephone system, subscribers' lines, a selector switch having a vertical step-by-step motion adapted to extend connection from a calling subscriber's line to a called subscriber's line, a line relay in said selector, a magnet for controlling said step-by-step motion and a slow acting relay connected in multiple circuits and controlled by said line relay, means for energizing said line relay and thereby energizing said vertical magnet and slow acting relay, and means controlled by the slow acting relay for de-energizing said line relay.

45. In a telephone system, subscribers' lines divided into groups, an automatic switch having motion in one plane to select groups and motion in another plane to find a line in a selected group, a pair of relays bridged across said line, a third relay included in said bridge, a side switch controlled by said third relay, an operating magnet controlled by said pair of relays, and means controlled at the substation for controlling said third relay to prevent the operation of said operating magnet.

46. In a telephone system, a subscriber's line, an automatic switch having a vertical step-by-step motion, a line relay and a slow acting relay forming a reciprocating element to produce impulses for raising the shaft, a magnet at the substation responsive to said impulses, and a resistance at the substation adapted to be bridged across the line to prevent the operation of said relays.

47. In a telephone system, subscribers' lines, a central office, automatic switches at said central office, means whereby a called subscriber can signal the central office, means for releasing said switches, and means for preventing the releasing of said switches until after the operation of said signal.

48. In a telephone system, subscribers' lines, a central office, connector switches, means for operating the same, a pair of relays bridged across the called line, means whereby the subscriber can control said relays to operate a suitable signal, and means for preventing the release of the switches until after the operation of said signal.

49. In a telephone system, means for setting up a talking circuit between a calling and a called subscriber's line, a connector switch controlled exclusively over two sides of the talking circuit in series to select and seize the called line, means controlled by the calling subscriber for releasing said switch, and means for preventing a calling subscriber from releasing said switch.

59. In a telephone system, a calling and a called line, means including a trunk line and a connector switch for connecting the subscribers on said lines in conversation, said connector being controllable over the two sides of said trunk line in series, and means for releasing said connector controlled by whichever one of said subscribers who last replaces his receiver.

Signed by me at Chicago, Cook County, Illinois, this 28 day of July 1920.

OMER KIRBY.